United States Patent [19]

Willinger

[11] Patent Number: 4,532,037
[45] Date of Patent: Jul. 30, 1985

[54] AQUARIUM AERATING DEVICE

[75] Inventor: Allan H. Willinger, Englewood, N.J.

[73] Assignee: Willinger Bros., Inc., Englewood, N.J.

[21] Appl. No.: 512,331

[22] Filed: Jul. 11, 1983

[51] Int. Cl.³ .................. B01D 35/00; E03B 11/12
[52] U.S. Cl. ............................... 210/169; 210/416.2
[58] Field of Search ............... 210/150, 151, 195.1, 210/226, 416.1, 416.2, 416.3, 472, 169; 261/122, 124, 77, 121 M

[56] References Cited

U.S. PATENT DOCUMENTS

| | | | |
|---|---|---|---|
| 1,920,220 | 8/1933 | Staley | 210/169 |
| 2,008,363 | 7/1935 | Maris | 261/121 M |
| 2,653,903 | 9/1953 | Rodda | 210/169 |
| 2,770,319 | 11/1956 | Hagenbook | 261/124 |
| 2,824,728 | 2/1958 | Crawford | 261/121 M |
| 3,348,330 | 10/1967 | Gilliam | 261/121 M |
| 3,891,555 | 6/1975 | Bennett et al. | 210/335 |
| 4,054,524 | 10/1977 | Mackrle et al. | 210/195.1 |
| 4,072,612 | 2/1978 | Daniel | 210/169 |
| 4,144,841 | 3/1979 | Bliss et al. | 210/169 |
| 4,148,730 | 4/1979 | Willinger | 210/169 |

FOREIGN PATENT DOCUMENTS 7036482 11/1970 Japan ..................... 261/122

Primary Examiner—Barry S. Richman
Assistant Examiner—Titus B. Ledbetter, Jr.
Attorney, Agent, or Firm—Abraham Friedman

[57] ABSTRACT

An aquarium filter and aerating device for insertion in an aquarium tank comprising an elongated hollow body member having an open bottom end and defining an interior chamber therein. An upper end wall on said body member closes the top of the chamber, and includes therein a plurality of apertures. An air conduit connector extends upwardly from the upper end wall through which air can be pumped from an external pump into the interior chamber. The air lowers the water head in the chamber to an appropriate level within the chamber, and forces the air pumped into the chamber upward and out through the apertures to cause a stream of air bubbles to flow into the aquarium tank to thereby aerate it.

3 Claims, 8 Drawing Figures

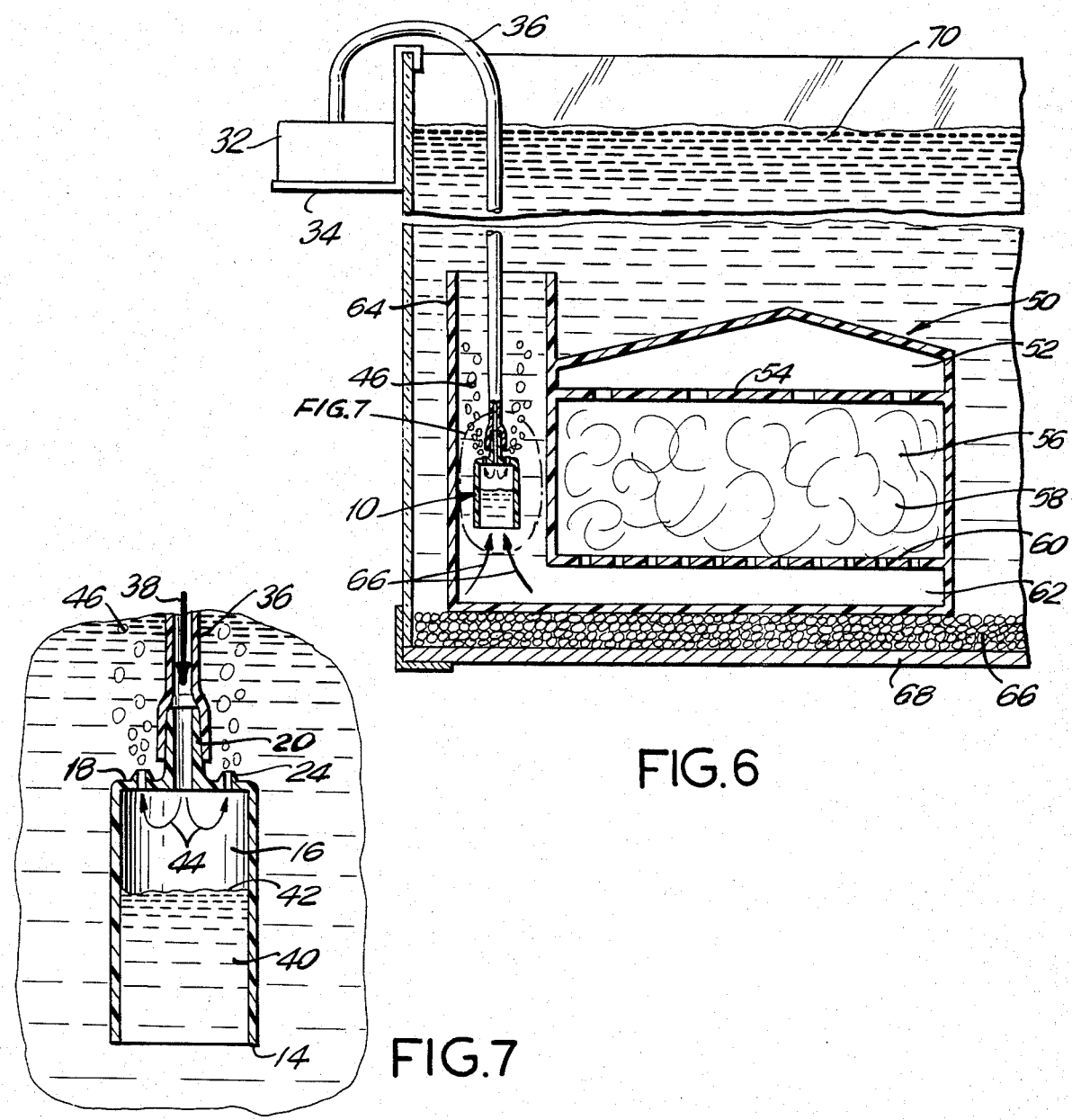
FIG.6
FIG.7
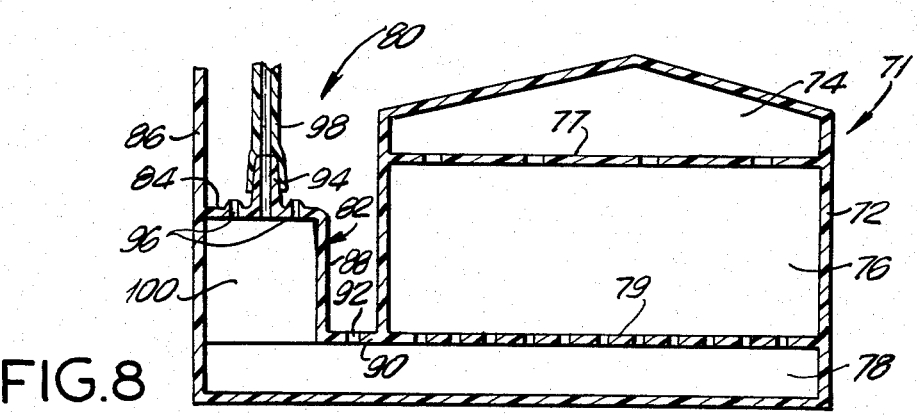
FIG.8

AQUARIUM AERATING DEVICE

BACKGROUND OF THE INVENTION

This invention relates generally to aquarium aeration devices and more particularly to an air diffuser for use in an aquarium tank.

In the use of aquarium tanks, there is a general need to enrich the oxygen content of the water in the aquarium. This is usually accomplished by means of bubbling air through the water. This artificial aeration of the water in the aquarium tank is generated through an air pump connected into the aquarium tank by means of a conduit.

In order to provide a suitable stream of bubbles to properly aerate the water, it is general procedure to utilize an "air stone" connected at the end of the conduit and submerged into the water. The air stone is generally of a porous material having an input stem connected to it. The air supply from the pump is directed through the porous material and exits as a stream of bubbles.

When a filter is included in the aquarium tank, it is also common practice to associate the air stone with the air lift tube of the aquarium filter. The filter typically includes a filtration compartment for storing filtering material and through which the contaminated water in the tank is drawn. The water from the filtration compartment which is decontaminated, is then emitted through an air lift tube. The air stone is retained within the air lift tube and, as the stream of bubbles pass upwardly from the air stone through the air lift tube, it draws with it the decontaminated water from the filtration compartment.

In this manner, the stream of air bubbles serves both to provide the necessary aeration of the water, and at the same time draws the decontaminated water from the filtration compartment back into the tank so that new contaminated water from the tank can be drawn through the filter.

Existing air stones, have generally required continuous maintenance and replacement. Typically, an air stone can get clogged because of various internal aquarium conditions. For example, algae and bacterial slime can build up on the pores of the air stone and prevent the flow of air through the pores. A mineral residue can also build up at the air-water interface. Furthermore, dust in the air flow can plug the openings in the air stones from the inside.

When an air stone gets clogged, it will prevent the flow of air from the pump into the tank thereby reducing the amount of air available in the tank. It will also slow down the filtering rate when the air stone is associated with a filter, and may therefore fail to provide sufficient filtering action in the aquarium tank thereby creating a dangerous condition. Additionally, as the pores of the air stone continue to clog, back pressure is built up onto the pump. Sufficient back pressure can destroy the pump by tearing the pump diaphragm or other parts of the pump operating under pumping action.

It has therefore been necessary to continuously monitor the air stones and replace them at regular intervals. Normally, once an air stone becomes clogged, it may not be possible to clean it and replacement of the air stone is the only available solution. This results in a continuous maintenance problem, a costly situation, and, if not properly attended to, can result in a dangerous condition within the aquarium tank, and can also lead to the possible destruction of the air pump.

SUMMARY OF THE INVENTION

Accordingly, it is an object of the present invention is to provide an aquarium aerating device which avoids the aforementioned problems of prior art air stones.

Another object of the present invention is to provide an aquarium aerating device which can be utilized with existing air pumps, and avoids the possibility of increased back pressure on the air pump.

Still a further object of the present invention is to provide an aquarium aerating device which converts a flow of supply air into a stream of bubbles for aeration into the aquarium tank.

Another object of the present invention is to provide an aquarium aerating device which prevents excessive back pressure from building up, by maintaining an internal security blow-out system.

Yet a further object of the present invention is to provide an aquarium aerating device which avoids clogging by means of dust in the air flow.

Still a further object of the present invention is to provide an aquarium aerating device which can be utilized in conjunction with the air lift tubes of filtering equipment.

Yet another object of the present invention is to provide an aquarium aerating device which can be integrally formed with the air lift tube of an aquarium filtering equipment.

Yet another object of the present invention is to provide an aquarium aerating device which can be easily cleaned, readily maintained, and prevents destruction of a pump even when it gets clogged.

Briefly, in accordance with the present invention, there is provided an aquarium aerating device formed of an elongated hollow body member having an open bottom end, and which defines an interior chamber therein. An upper end wall is provided on the body member which closes the top of the chamber. However, the upper end wall includes a plurality of apertures formed therethrough. An air conduit connector is coupled to the device and in communication with the interior chamber for admitting air into the chamber. The device is placed in the aquarium tank and connected to an air pump by means of a tube coupled to the air conduit connector. Air is them pumped into the interior chamber and pushes against a head of water formed in the lower part of the chamber. The level of the water head will depend upon the depth of the device in the tank the amount of pressure provided from the pump, the size of the device, the size of the tank, and other factors. However, these can by adjusted to retain the water head within the chamber. The air supply will therefore leave through the apertures as a stream of small air bubbles thereby aerating the water. Should the apertures become clogged, the air supply will push downward against the water head and can exit through the bottom of the interior chamber.

In an embodiment of the invention, the aerating device can be placed within the air lift tube of an aquarium filter such that the stream of bubbles produced through the apertures will draw up the decontaminated water from the aquarium filter and cause the flow of aquarium contaminated water through the filtering equipment. The aquarium aerating device can be integrally molded as part of the air lift tube, and can also be integrally formed as part of the aquarium filter itself.

The aforementioned objects, features and advantages of the invention will, in part, be pointed out with particularity and will, in part, become obvious from the following more detailed description of the invention, taken in conjunction with the accompanying drawings, which form an integral part thereof.

BRIEF DESCRIPTION OF THE DRAWINGS

In the FIGS.:

FIG. 6 is a cross section elevational view showing an aquarium filter positioned within an aquarium tank and utilizing the aquarium aeration device of the present invention;

FIG. 7 is an exploded view of the section shown in Figs. 5 and 6, and

FIG. 8 is a schematic cross sectional view of an aquarium filtering system including the aeration device of the present invention being integrally formed therein.

In the various figures of the drawings, like reference characters designate like parts.

DESCRIPTION OF THE PREFERRED EMBODIMENT

Figure 1:
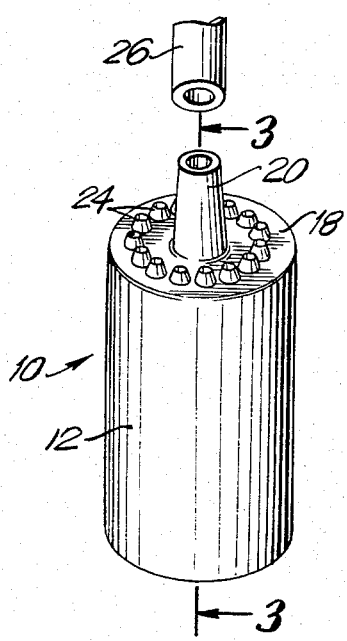
FIG. 1 is a perspective view of the aquarium aerating device of the present invention.
Figure 2:
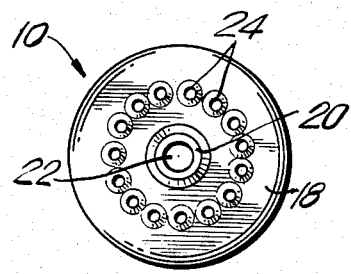
FIG. 2 is a top view of the device shown in FIG. 1.
Figure 3:
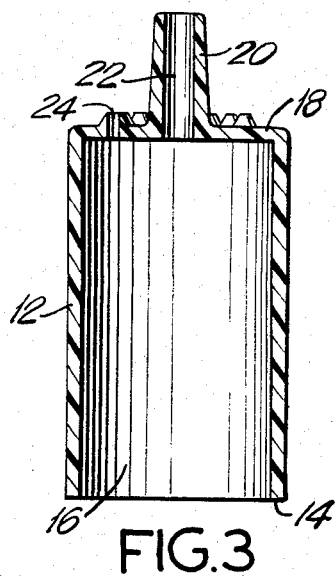
FIG. 3 is a cross sectional view taken along lines 3—3 of FIG. 1.

Referring now to FIGS. 1–3, the aquarium aeration device of the present invention is shown generally at 10 and comprises an elongated, generally cylindrical body member 12 having a peripheral side wall 14 terminating in an open bottom 14 so as to define an internal chamber 16. At the top of the body member 12, there is provided an upper wall 18 which closes off the top of the internal chamber 16. An upwardly extending hollow stem 20 is formed on the upper wall 18 having an internal opening 22 formed therein and defining an air inlet. The entire device can be molded out of one piece construction, and formed out of either metal, plastic, or the like. The connecting stem 20 can be upwardly tapered in order to facilitate connection of a conduit 26 extending from a pump.

Figure 5:
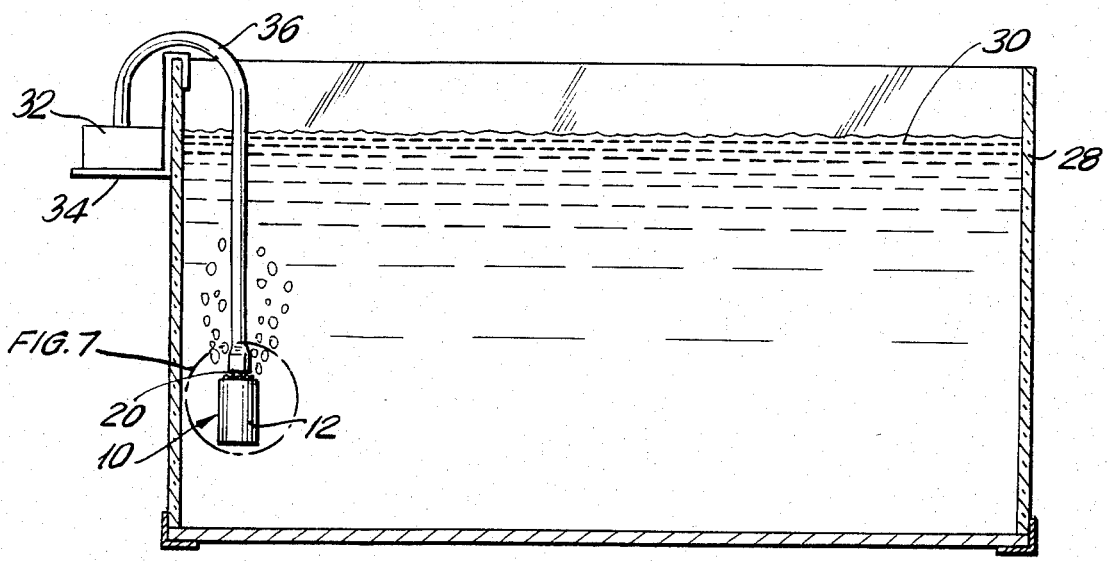
FIG. 5 is a cross sectional view showing the aeration device of the present invention in use in an aquarium tank.

The operation of the aerating device can best be understood in conjunction with FIGS. 5 and 7. In FIG. 5 there is shown as aquarium tank 28 having therein water 30. An air pump 32 is supported externally of the tank by means of an L-shaped hook arrangement 34 overhanging the upper edge of the aquarium tank wall 28. A conduit 36 extends from the pump 32 to the aerating device 10 of the present invention, which is shown submerged within the tank. Air from the pump 32 is fed into the aerating device 10 through the stem 20 provided at the upper wall of the device.

As best shown in FIG. 7, the air is pumped in through the conduit 36 in the direction shown by the arrow 38. As the air passes through the stem 20, it enters the internal chamber 16 and forces down the level of the water 40 in the chamber, so that the water achieves a water head level 42. As the air flow continues to enter along line 38, it is forced upward through the apertures 24 provided in the upper wall 18, as shown by the arrows 44. Although the air may feed in as a continuous or pulsating air stream, once it leaves through the apertures 24 it is converted into a stream of bubbles 46 which will enter into the water.

The bubbling of the air into the water serves to aerate the water since the air is absorbed from the air bubbles. The action of the rising bubbles also causes a circulation of the water in the tank, and in this way fresh oxygen is circulated through the aquarium. The aeration serves to rid the aquarium of carbon dioxide, provide extra oxygen to the water, and provides the aquarium with increased fish holding capacity.

The level of the water head 42 in the interior chamber of the aeration device, will depend upon a number of controlable factors. For example, increasing the air pump pressure can serve to lower the level of the water head 42 in the chamber 16. Similarly, the depth to which the aerating device is lowered within the air tank may vary the water head level, as will the size of the tank in which the aerating device is inserted. Additionally, the size of the aerating tank may also cause the level to change.

When a vibrating type pump is utilized, the vibrator delivers a pulsating flow of air along line 38 into the device. The air pressure in the interior chamber 16 will therefore vibrate causing the water head level 42 to also pulsate within the chamber. This, in turn, forces small bubbles in rapid bursts through the apertures 24. The pulsating small bubbles produces a more even and quieter flow.

When types of non-vibrating pumps are utilized, there with be produced a non-pulsating flow of air into the interior chamber, with a resulting air stream of coarser bubbles. These will also serve to suitably aerate the device, although they may produce more noise than the smaller pulsating supply.

Normally, the prior art air stones would get clogged by means of the various algae and slime building up in the pores, or mineral residue at the air-water interface. Additionally, dust in the air flow can plus openings in the air stone from the inside. When such clogging occurs, the air stones would provide large back pressure which might damage the pump and prevent further suitable aeration to the aquarium. With the present invention, should any of the apertures 24 become clogged, and should there be a greater back pressure built up within the chamber 16, the water head level 42 within the chamber 16 will be lowered. Even if all of the apertures get clogged, so that no air can leave through the aperture, the air pumped into the chamber 16 will completely eliminate the water head from the chamber 16 and the air supply will flow out directly through the bottom 14 of the device. As a result, air will still be permitted to be pumped into the aquarium tank, although it may not be dispersed through the apertures into small bubbles. However, since the air will continue to flow, no damage will occur to the aquarium. Furthermore, since the back pressure will be eliminated, the pump diaphragm will not be torn, and the pump will not be destroyed. Any filter contained within the aquarium will also continue to operate properly.

Although normally with the particular device as shown, there will be reduced opportunity for clogging, nevertheless, even if clogging should occur from algae and mineral deposits, it is easy to remove the device and clean it whenever the filter is changed. The entire aeration device need not be thrown away and replaced as was required with prior art air stones. The device need only be cleaned out and can be returned for continued use.

As shown in FIG. 5, the aeration device of the present invention is used independently to provide aeration within an aquarium tank. It can also be utilized as part of an aquarium filtering apparatus, as shown in FIG. 6. More particularly, there is generally shown a filtering apparatus 50 which includes an inlet chamber 52 receiving the contaminated water from the aquarium tank and passing the water through a grating 54 to enter a filtration chamber 56. Appropriate filtering material 58 is provided within the filtration chamber. Contaminated water entering into the filter passes through the inlet chamber 52, through the filtration chamber 56, and then through the grating 60 to the clean water chamber 62.

An air lift 64 is provided on the filtering device and operates in a conventional manner. More particularly, a suitable air stream is sent into the air lift and, as the air bubbles are caused to rise in the air lift, they draw up the clean water from the clean water chamber 62 and at the same time provide aeration to the clean water. Further details of filtering devices can be found in U.S. Pat. Nos. 4,186,093 and 3,630,367.

In the present invention, the aeration device 10 is shown inserted into the air lift and the conduit 36 is connected from a pump 32 to supply a stream of water into the device 10. The pump is retained in place by means of the bracket 34. As the air is pumped into the device 10, bubbles 46 will float up the air lift tube 64 from the device, drawing with it the clean water along the arrows shown at 66. The entire filter 50 is shown seated upon a gravel bed 66 on the floor of the aquarium tank 68 in which water 70 is retained.

As shown in FIG. 6, not only is the aeration device of the present invention being utilized to provide the necessary aeration to the aquarium, it is also used as part of the air lift in order to draw up the clean water through the filter so as to draw additional contaminated water from the water 70 in the aquarium 68 to pass through the filter.

The aeration device 10 of the present invention can be suspended into the air lift 64, as was heretofore done in connection with air stones. In this manner, the aeration device of the present invention operates on a manner similar to previous air stones, however, it does provide the additional beneficial results heretofore described.

Since the present aeration device need not be continuously replaced, and is also not formed of porous material, it can be integrally formed as part of the filtration device itself, as is shown in FIG. 7. Filtering device 70 is schematically shown, and includes a housing 72 having an inlet compartment 74, a filtering compartment 76, and a clean water chamber 78. Suitable gratings 80 separate the inlet compartment 74 from the filtering compartment 76, and grating 82 separates the clean water chamber 78 from the filtering compartment 76.

An air lift tube 80 is integrally molded as part of the filtering apparatus. However, within the air lift 80 there is also formed the aerating device 82. The device 82 is defined by means of a transverse wall 84 extending from one side wall 86 of the air lift chamber 80 and continues into the downwardly depending wall 88 terminating at the bottom grating section 90. Suitable apertures 92 are provided in the grating 90.

A connecting stem 94 is provided on the transverse upper wall 84. A plurality of apertures 96 are formed within the transverse wall 84. Tube 98 can be connected to the stem 94 for provision of an air supply from an external pump.

In operation, an air/water chamber 100 is defined between the vertical wall 86 of the air lift tube, the transverse wall 84, and the downwardly depending wall 88. As air is sent from tube 98 into the chamber 100, it will reduce the level of the water in the chamber 100 providing a water head therein depending upon the air pressure, etc. The continued supply of air into the chamber 100 will pass through the apertures 96 and cause a stream of bubbles to pass upwardly in the air lift tube 80. This will serve to aerate the water and also cause water to be drawn from the clear water supply 78 up through the apertures 92, into the air lift tube 80 to cause a flow of water through the filter.

It should therefore be appreciated that because of the present construction, it is possible to integrally mold the aeration device directly within the filter. Since the aeration device does not have to be replaced, but only cleaned, whenever the filter is cleaned the aeration device can also be cleaned and then reused. This avoids the necessity of an air stone, and yet provides the aeration heretofore supplied by such air stones.

Figure 4:
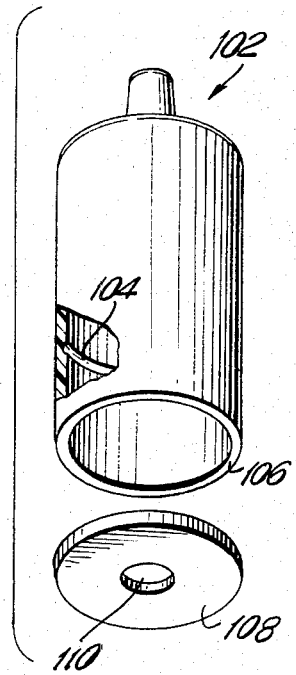
FIG. 4 is a perspective view, partially broken away, of an aquarium aeration device in accordance with another embodiment of the present invention.

Referring now to FIG. 4, there is shown an alternate embodiment of the present invention, wherein the aeration device 102 is shown substantially as in FIG. 1, however, a peripheral internal groove 104 is formed proximate the lower end 106 of the device for receiving a weighted washer 108. The washer is shown as a circular member having a central aperture 10 formed therein. The washer 108 can be seated into the groove 104 to provide a weight for retaining the aeration device at a desired location near or at the bottom of an aquarium tank. The aperture 110 in the bottom of the washer is available for permitting the blow out of air, should the aeration device become clogged, and thereby prevents damage to the aquarium, the filter and the pump.

There has been disclosed heretofore the best embodiments of the invention presently contemplated. However, it is to be understood that various changes and modification may be made thereto without departing from the spirit of the invention.

I claim:

1. An integral aquarium filter and aeration device for an aquarium tank, comprising a housing having an inlet compartment in fluid flow relation with the tank, a filtration compartment in fluid flow relation with said inlet compartment, said filtration compartment adaptable to contain a mass of filtering material, an air lift tube in communication with said filtration compartment for the ingress of air and the egress of decontaminated water out of the filtration compartment, an integral aeration device within the air lift tube for aeration of the decontaminated water comprising an open ended container formed within said air lift tube and defining therein a chamber having an open lower end for maintaining therein a balance between a head of water and a pressurized air stream, air supply means passing downwardly through the open upper end of said air lift tube and coupled to an upper end of said container for directing ingressed air into said chamber to form the pressurized air stream, and a plurality of apertures formed at an upper end of said container through which the air in the chamber can exit as a stream of bubbles, thereby causing the decontaminated water from the filtration compartment to egress upwardly through said air lift, whereby said apertures may be readily cleaned out when they become clogged with debris from the aquarium water, and the aquarium filter together with its integral aeration device can be reused.

2. An aquarium filter as in claim 1, wherein said air lift tube comprises an elongated tubular member, said container comprises a transverse wall extending into said tubular member and having said plurality of apertures formed therein, a partition wall depending from said transverse wall, and an air supply connector means coupled to said transverse wall.

3. An aquarium filter as in claim 1, wherein said air lift tube and said chamber are integrally molded in a unitary construction.

* * * * *